June 4, 1935.  L. L. LADD  2,003,451
KILN
Filed Jan. 26, 1934   3 Sheets-Sheet 1
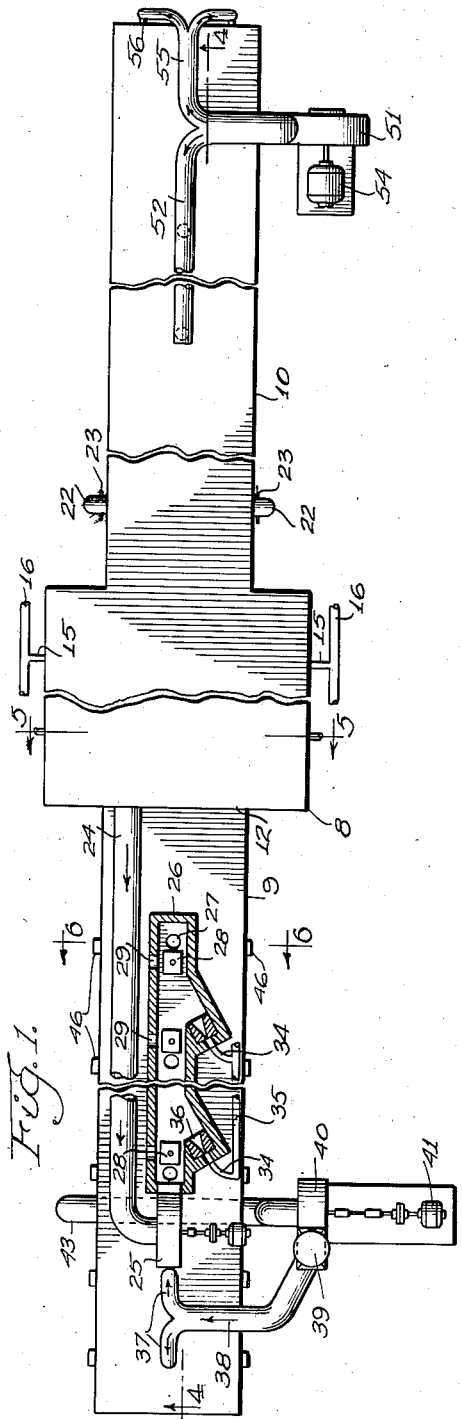
Witnesses
Arthur M. Franke
Wm. E. Anderson
Inventor
Lester L. Ladd
By Fisher, Clapp, Soans, & Pond
Attys.

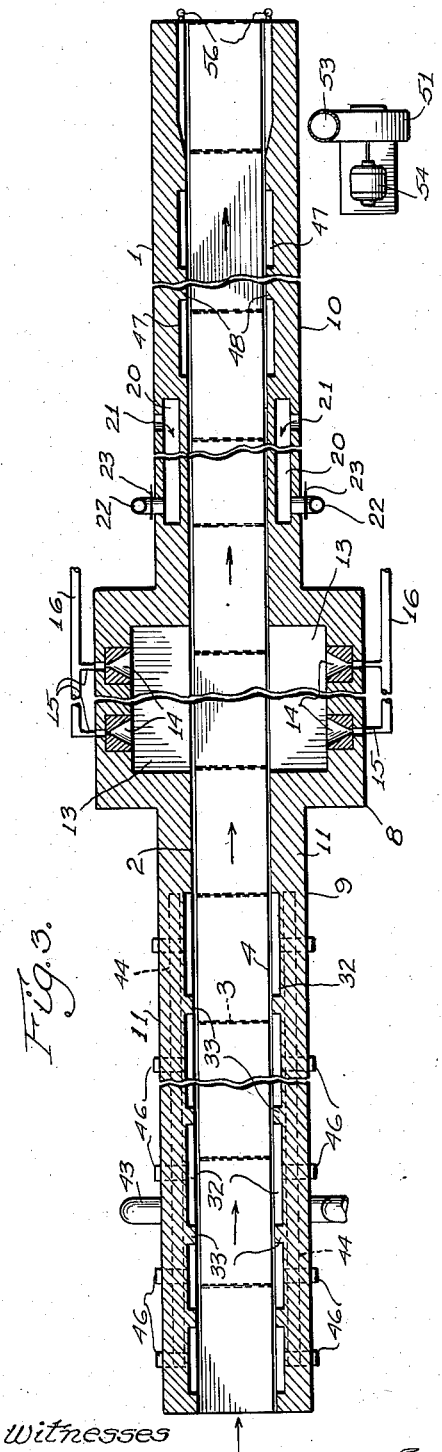
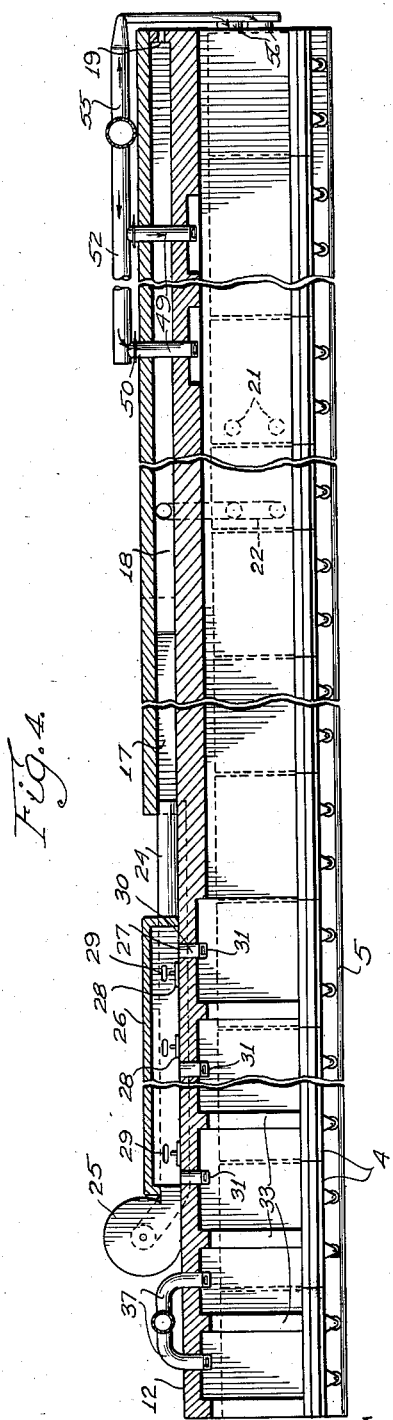

June 4, 1935.  L. L. LADD  2,003,451
KILN
Filed Jan. 26, 1934  3 Sheets-Sheet 3
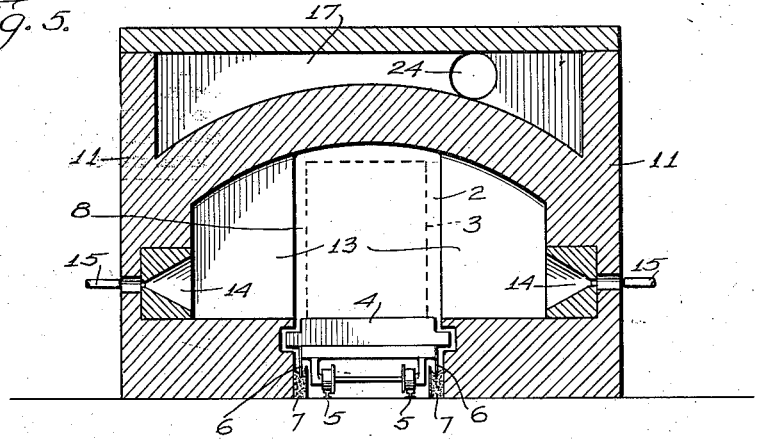
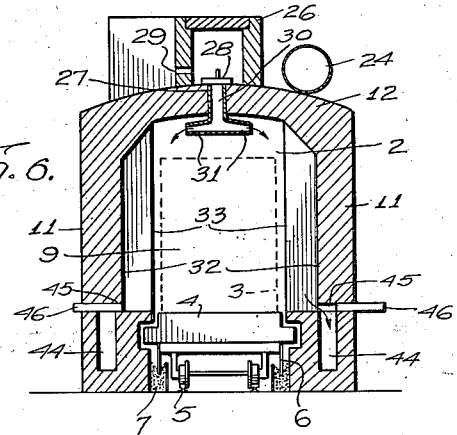

Patented June 4, 1935

2,003,451

UNITED STATES PATENT OFFICE 2,003,451

KILN

Lester L. Ladd, Lockport, Ill.

Application January 26, 1934, Serial No. 708,366

11 Claims. (Cl. 25—142)

This invention relates to tunnel kilns particularly adapted for use in firing bricks and other ceramic products, and it is applicable to kilns of the straight type as well as annular kilns.

Both types of tunnel kilns have a pre-heating zone, a firing zone, and a cooling zone through which the ware travels successively either on trucks, as is the case in straight kilns, or on an endless conveyer, as in annular kilns.

In tunnel kilns as heretofore constructed, the heat from the firing zone had a tendency to float outwardly along the roof of the ware passage toward the ends of the kiln with the result that, at any given point in the pre-heating or cooling zone, the temperature in the upper portion of the ware passage was considerably higher than the temperature in its central and lower portions. Such uneven distribution of the heat in the ware passage is objectionable because it renders impossible a uniform treatment of all of the ware.

Moreover, in kilns heretofore in general use, the ware upon entering the pre-heating zone was subjected to a comparatively dry heat adjacent the entrance of the kiln which was objectionable because under such conditions there is a tendency to dry and harden the surface of the ware before the interior of the ware has been heated sufficiently to drive out its moisture. Such objectionable case hardening has frequently resulted in cracking of the ware and in the formation of carbon deposits within the ware.

The main objects of this invention are to provide a tunnel kiln having improved means for causing the air within the pre-heating and cooling zones to whirl transversely of the direction of travel of the ware whereby the heat is evenly distributed in the ware passage at any given point in the travel of the ware; to provide improved means for humidifying the air in the pre-heating zone adjacent the entrance so as to prevent mere case hardening of the ware and to permit thorough heating and drying of the interior of the ware; to provide improved mechanism for accurately controlling the temperature at any given point in the preheating and cooling zones relative to the temperatures at other points so as to permit variation of the temperature curve through the kiln which has been found highly desirable in a kiln used for firing various kinds of ware as will be well understood by those skilled in this art; and to provide a tunnel kiln having improved means for conserving the heat which is radiated from the cooling zone.

An illustrative embodiment of this invention is shown in the accompanying drawings, wherein:—

Figure 1 is a top plan of an improved tunnel kiln, parts thereof being broken away.

Figure 2 is a side elevation of the same.

Figure 3 is a longitudinal horizontal section taken on the line 3—3 of Fig. 2, the ware being illustrated in dotted outline.

Figure 4 is a longitudinal vertical section taken on line 4—4 of Figure 1.

Figure 5 is a transverse vertical section of the kiln at the firing zone, the view being taken on the line 5—5 of Figure 1.

Figure 6 is a transverse vertical section of the kiln at the pre-heating zone, the view being taken on the line 6—6 of Figure 1.

Figure 7 is an enlarged end view of the kiln, taken from the left of Figure 1.

In the construction illustrated, the kiln is of the straight type and comprises a tunnel 1 having a central passage 2 through which the ware 3 is conveyed by means of trucks 4 which are mounted on rails 5 and which are provided with aprons 6 dipping into the usual sand troughs 7 for shielding the truck bearings from the intense heat of the ware passage. The tunnel defines an intermediate firing zone 8, a pre-heating zone 9 at the ware inlet end of the kiln, and a cooling zone 10 at the ware outlet end.

The tunnel comprises side walls 11 and a roof 12 which vary in cross section at different zones of the kiln, as shown in Figs. 3, 5 and 6. These side walls and roof surround the ware passage and are composed of various heat resisting materials such as brick, fire brick, tile, refractory, infusorial earth, and similar materials.

At the firing zone, the tunnel is formed to provide the usual combustion chambers 13 on respectively opposite sides of the ware passage. The outer walls of these combustion chambers are provided with fuel inlets 14 for a plurality of nozzles 15 which are connected to the usual manifolds 16 of the fuel supply.

In all types of tunnel kilns, the pre-heating zone receives its primary supply of heat by direct radiation from the firing zone through the central ware passage. In my improved kiln, I supplement this primary heat by injecting into the pre-heating zone air which has been heated by radiation from the roof of the firing and cooling zones and from the side walls of the cooling zone. I am thereby able to conserve much of the heat which is ordinarily lost in tunnel kilns.

Formed in the roof of the firing zone, is a chamber 17 communicating with a chamber 18 in the roof of the cooling zone. The chamber 18 has an air inlet 19 at the end of the kiln. Formed in the side walls of the cooling zone, are chambers 20 provided with air inlets 21. The air in the chambers 20 is heated by radiation from the walls of the cooling zone and is conducted to the chamber 18 through conduits 22 which may be controlled by dampers 23.

The heated air is drawn from the chamber 17 through a pipe 24 by means of a fan 25 which directs the heated air into a housing 26 on top of the pre-heating zone. This housing communicates with the pre-heating zone of the ware passage through openings 27 spaced apart the desired distance longitudinally of the kiln. These openings are controlled by valve plates 28 slidably mounted on the roof of the kiln so as to be adapted to partially or wholly cover the respective openings. Openings 29 in one of the side walls of the housing 26 permit the insertion of a suitable tool (not shown) for shifting the valve plates 28.

Seated in the openings 27 are depending injectors 30 for delivering the heated air from the housing 26 to the pre-heating zone. Each of these injectors comprises a pair of connected nozzles 31 which are disposed substantially normal to the path of movement of the ware for directing two streams of heated air toward respectively opposite walls of the ware passage. These nozzles therefore whirl the air at substantially right angles to the path of the ware and prevent the heat from merely floating in the upper part of the ware passage. With this improved construction the heat is evenly distributed throughout the ware and the ware in the bottom and central portions of each stack is dried as thorough and as quickly as the ware near the roof.

The side walls of the preheating zone are preferably recessed as shown at 32 so as to provide vertical baffles 33 spaced apart longitudinally of the kiln.

In order to further increase the temperature at any desired point in the travel of the ware through the pre-heating zone, I propose to mount suitable burners 34 at intervals along the housing 26. These burners are connected to a manifold 35 and they extend into openings 36 in one wall of the housing 26.

In order to prevent too rapid drying and hardening of the surface of the ware, moist air is injected into the pre-heating zone at one or more places adjacent the entrance of the kiln. This is done by injectors 37 similar in construction to the injectors 30. The injectors 37 are disposed so as to whirl the moist air transversely of the path of the ware so that all of the ware may be uniformly treated. These injectors communicate with a pipe 38 connected to a stack 39 into which the moist air is forced by a fan 40 which is driven by a motor 41. A damper 42 may be placed in the stack for controlling the amount of air that is permitted to be driven off.

The intake of the fan 40 communicates with a pipe 43 which leads from a pair of air channels 44 formed in the side walls of the kiln adjacent the pre-heating zone. These channels communicate with the pre-heating zone through openings 45 near the floor of the kiln. These openings may be suitably spaced apart longitudinally of the kiln and they are individually controlled by dampers 46. By this improved construction, the moisture which is given off by the ware during the drying process, is injected into the pre-heating zone at the entrance of the kiln where it prevents the objectionable case hardening of the ware.

In the cooling zone of the kiln, the walls and roof of the tunnel are recessed as shown at 47 to provide a series of baffles 48. Located in the recesses of the roof of the cooling zone are cool air injectors 49 of similar construction to the injectors 30. These injectors are arranged to whirl the cool air transversely of the path of the ware for cooling all of the ware uniformly.

The injectors 49 may be individually controlled by dampers 50 and communicate with a blower 51 through a horizontal pipe 52 and a vertical pipe 53. The blower is driven by a motor 54. Also connected to the pipe 53 is a branch pipe 55 having nozzles 56 extending through the ware outlet end of the kiln.

In operation, the ware is stacked on the trucks 4 which are then moved through the tunnel in the direction of the arrows indicated in Fig 3. Upon entering the pre-heating zone, the ware is immediately subjected to the moist warm air issuing from the injectors 37 which may be about 300° F. in some types of kilns. This moist air heats the ware to the desired initial pre-heating stage without case hardening the ware. The amount of moist air injected into the pre-heating zone at the entrance may be varied within certain limits by means of the dampers 42 and 46. The ware then passes beneath the injectors 30 where the temperature may be raised to the exact temperature required and accurately controlled by means of the dampers or valves 23 and 28 and the burners 34.

In the pre-heating zone, it is necessary to gradually raise the temperature of the ware up to the fusion point to prevent cracking but, after the fusion point is reached, the temperature of the ware may be quickly raised to the peak temperature without danger of cracking the goods. With the improved construction herein shown, I can accurately control the temperature of the ware throughout the pre-heating period.

After leaving the firing zone, the ware passes through the cooling zone where it may be quickly cooled to the fusion point after which it should be cooled more gradually to prevent cracking. The ability to properly cool the ware is present in this improved kiln because, by means of the air chambers 20 and injectors 49 I can accurately control the temperature of the ware at all points in the cooling zone.

With this type of kiln, the ware may be properly fired and cooled in a much shorter period than has heretofore been possible.

Although but one specific embodiment of this invention has been herein shown and described, it will be understood that details of the construction shown may be altered or omitted without departing from the spirit of the invention as defined by the following claims.

I claim:

1. A tunnel kiln comprising a tunnel having a ware passage through which the ware travels, and a pair of nozzles in the upper portion of said passage directed toward respectively opposite sides of said passage, and means for forcing air through said nozzles into said passage.

2. A tunnel kiln comprising side walls and a roof defining a ware passage having a pre-heating zone, a firing zone, and a cooling zone through which the ware travels successively, an air chamber in the roof of said firing zone adapted to be heated by radiation from said roof, an air passage located above said pre-heating zone and communicating with said chamber and having a plurality of outlets communicating with the pre-heating zone of said ware passage at various points above the path of the ware, dampers for individually controlling the flow of air through said outlets, and means for forcing heated air from said chamber through said air passage.

3. A tunnel kiln comprising side walls and a roof defining a ware passage having a pre-heating zone, a firing zone, and a cooling zone through which the ware travels successively, an air chamber in the roof of said firing and cooling zones adapted to be heated by radiation from said roof and having an air inlet adjacent the ware outlet of the tunnel, an air passage located above said pre-heating zone and communicating with said chamber and having a plurality of outlets communicating with the upper portion of the ware passage in the pre-heating zone, said outlets being spaced apart longitudinally of the kiln, a pair of nozzles communicating with each of said outlets and directed toward respectively opposite sides of said ware passage, dampers for individually controlling said outlets, and a fan for moving the heated air from said chamber through said air passage and nozzles.

4. A tunnel kiln comprising side walls and a roof defining a ware passage having a pre-heating zone, a firing zone, and a cooling zone through which the ware travels successively, an air chamber in the roof of said firing and cooling zones adapted to be heated by radiation from said roof, other air chambers located in the side walls of the cooling zone and adapted to be heated by said walls, said other chambers communicating directly with said roof chamber and having fresh air inlets, an air passage providing communication between said roof chamber and the ware passage of said pre-heating zone, and a fan for moving heated air from said chambers through said air passage.

5. A tunnel kiln comprising side walls and a roof defining a ware passage having a pre-heating zone, a firing zone, and a cooling zone through which the ware travels successively, the air in the ware passage of the pre-heating zone being moistened by the ware, and means for withdrawing some of the moist air from certain portions of the pre-heating zone and for re-delivering such moist air to the ware passage at a point adjacent the ware entrance.

6. A tunnel kiln comprising side walls and a roof defining a ware passage having a pre-heating zone, a firing zone, and a cooling zone through which the ware travels successively, an air passage located in a side wall of the pre-heating zone and having a plurality of air inlets communicating with the ware passage of the pre-heating zone, dampers for individually controlling the flow of air through said inlets, said air passage having an outlet in said ware passage adjacent the ware entrance of the tunnel, and a fan for moving air through said passage.

7. A tunnel kiln comprising side walls and a roof defining a ware passage having a pre-heating zone, a firing zone, and a cooling zone through which the ware travels successively, an air passage located in a side wall of the pre-heating zone and having a plurality of air inlets communicating with the ware passage of the pre-heating zone, dampers for individually controlling the flow of air through said inlets, said air passage having an outlet in said ware passage adjacent the ware entrance of the tunnel, said air passage having also a damper controlled outlet leading to the outside of the kiln, and a fan for moving air through said passage.

8. A tunnel kiln comprising side walls and a roof defining a ware passage having a pre-heating zone, a firing zone, and a cooling zone through which the ware travels successively, a pair of nozzles in said cooling zone directed toward respectively opposite walls of said passage, and means for forcing air through said nozzles to whirl the air in the cooling zone transversely of the path of the ware.

9. A tunnel kiln comprising side walls and a roof defining a ware passage having a pre-heating zone, a firing zone, and a cooling zone through which the ware travels successively, an air inlet in the upper portion of the ware passage in the cooling zone, an air passage communicating with said inlet and with the outside of the kiln, and a fan for forcing air through said inlet and for whirling the air in said ware passage transversely of the path of the ware.

10. A tunnel kiln comprising side walls and a roof defining a ware passage having a pre-heating zone, a firing zone, and a cooling zone through which the ware travels successively, nozzles located in the roof of the cooling zone and spaced apart longitudinally of the tunnel, an air passage communicating with said nozzles and with the outside of the kiln, dampers for individually controlling the flow of air through said nozzles, and a fan for forcing air through said air passage and into said ware passage.

11. A tunnel kiln comprising a ware passage and defining a pre-heating zone, a firing zone, and a cooling zone through which the ware travels successively, an air chamber heated by radiation from said firing zone, an air passage for directing heated air from said chamber to the ware passage of the pre-heating zone, and means for adding heat to said air passage to further raise the temperature of the air entering the pre-heating zone.

LESTER L. LADD.